United States Patent
Fukushima et al.

(10) Patent No.: US 6,629,754 B1
(45) Date of Patent: Oct. 7, 2003

(54) INK JET PRINTER HEAD MANUFACTURING METHOD THEREOF, AND POLYCYCLIC THIOL COMPOUNDS

(75) Inventors: Hitoshi Fukushima, Tsukuba (JP); Satoru Miyashita, Chino (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 09/889,097

(22) PCT Filed: Nov. 10, 2000

(86) PCT No.: PCT/JP00/07963

§ 371 (c)(1),
(2), (4) Date: Jul. 11, 2001

(87) PCT Pub. No.: WO01/34398

PCT Pub. Date: May 17, 2001

(30) Foreign Application Priority Data

Nov. 11, 1999 (JP) .............................. 11-320466
Nov. 9, 2000 (JP) ...................................... 2000-342019

(51) Int. Cl.[7] ................................................ B41J 2/16
(52) U.S. Cl. ........................................................ 347/45
(58) Field of Search .............................. 347/45, 46, 47, 347/68, 69, 70

(56) References Cited

U.S. PATENT DOCUMENTS 6,074,040 A * 6/2000 Usui et al. ..................... 347/45

FOREIGN PATENT DOCUMENTS

| EP | 1157842 | * 11/2001 | ............ B41J/2/16 |
| JP | 6-198894 | 7/1994 | |
| JP | 7-314694 | 12/1995 | |
| JP | 11-188879 | 7/1999 | |
| WO | WO 95/25086 | 9/1995 | |

OTHER PUBLICATIONS

Graupe et al., "Terminally perfluorinated long–chain alkanethiols", Journal of Flourine Chemistry, 93 (1999) pp. 107–115.

* cited by examiner

*Primary Examiner*—Anh T. N. Vo
(74) *Attorney, Agent, or Firm*—Oliff & Berridge, PLC

(57) ABSTRACT

An object of the present invention is to provide a highly reliable ink jet printer head exhibiting a water-repellent property, low deterioration of ink drop ejection performance, and high friction resistance, along with a method of manufacturing this ink jet printer head. According to the present invention, in the case of an ink jet printer head wherein ink drops are ejected from nozzles formed in a nozzle surface, the ink jet printer head has a metal layer comprising metal formed on the nozzle surface and a self-organized film layer consisting of a polycyclic thiol compound formed on a top of the metal layer.

13 Claims, 12 Drawing Sheets

101 : INK JET PRINTER HEAD

INK JET PRINTER HEAD MANUFACTURING METHOD THEREOF, AND POLYCYCLIC THIOL COMPOUNDS

BACKGROUND OF THE INVENTION

1. Field of the Invention

The present invention relates to an ink jet printer head, and more particularly to an improvement of the nozzle surface of an ink jet printer head that selectively attaches ink drops onto a recording tedium.

2. Description of the Related Art

These days, high speed printing, low noise and high print quality are demanded of ink jet printers, and moreover high performance is demanded of ink jet printer heads. The state of the nozzle surface of an ink jet printer head is extremely important for satisfying these demands.

Ink, paper dust and the like may become attached to the nozzle surface, and if such attachments are present, then when an ink drop is ejected from the nozzle, the ink drop is attracted by the attachments and is ejected in a direction different from the original ejection direction; if the amount of such attachments is large, then ink drops may not be formed at all. In order to eliminate these problems, it is considered important to give the nozzle surface an ink-repellent property (i.e. a water-repellent property). By giving the nozzle surface an ink-repellent property, attachment of ink, paper dust and the like can be reduced. Moreover, in an ink jet printer head, it is also important to suppress deterioration of the ink drop ejection performance.

As art for giving a nozzle surface an ink-repellent property and suppressing deterioration of ink drop ejection performance, an ink jet printer head in which a water-repellent layer comprising a metal layer and a sulfur compound layer is formed on the nozzle surface has been proposed (International Patent Publication No. WO97/27059).

However, in the case of the ink jet printer head disclosed in the above-mentioned International Patent Publication, an alkanethiol compound, a dithiol compound having a single aromatic ring, or the like is used as the sulfur compound that forms the sulfur compound layer. Due to insufficient intermolecular cohesion of this sulfur compound, there is a risk of the sulfur compound layer deteriorating through external factors such as mechanical friction leading to a drop in the performance of the sulfur compound layer, which is a problem in terms of the reliability of the printer head.

An object of the present invention is thus to provide a highly reliable ink jet printer head exhibiting a water-repellent property, low deterioration of ink drop ejection performance, and high friction resistance, along with a method of manufacturing this ink jet printer head.

The inventors of the present invention carried out various studies, and as a result discovered that an ink jet printer head in which a layer consisting of a thiol compound having a certain specific structure is formed on top of a metal layer formed on the nozzle surface of the printer head is capable of achieving the above object.

SUMMARY OF THE INVENTION

The present invention was arrived at based on the above findings. The present invention provides an ink jet printer head wherein ink drops are ejected from nozzles formed in a nozzle surface, and wherein the ink jet printer head has a metal layer comprising metal formed on the nozzle surface and a self-organized film layer comprising a polycyclic thiol compound formed on top of the metal layer.

Moreover, the present invention also provides a method or manufacturing the above-mentioned ink jet printer head, comprising the steps of forming a metal layer on the nozzle surface of a nozzle member, and immersing the nozzle member on which the metal layer has been formed in a solution in which a polycyclic thiol compound has been dissolved.

Moreover, the present invention also provides the polycyclic thiol compounds represented by undermentioned general formulae (I) or (II):

wherein Cf is $CF_3(CF_2)_n$, $CF_3(CF_2)_n(CH_2)_m$, $(CF_3)_2CF(CF_2)_n$, $(CF_3)_2CF(CF_2)_n(CH_2)_m$, $(CF_3)_3C(CF_2)_n$ or $(CF_3)_3C(CF_2)_n(CH_2)_m$, n is an integer greater than or equal to 0, m is an integer greater than or equal to 1, k is an integer greater than or equal to 3, p is an integer greater than or equal to 1, and l is an integer from 1 to 4.

DESCRIPTION OF THE PREFERRED EMBODIMENTS

Following is a description of preferred embodiments of the present invention with reference to the drawings.

(First Embodiment)

Figure 1:
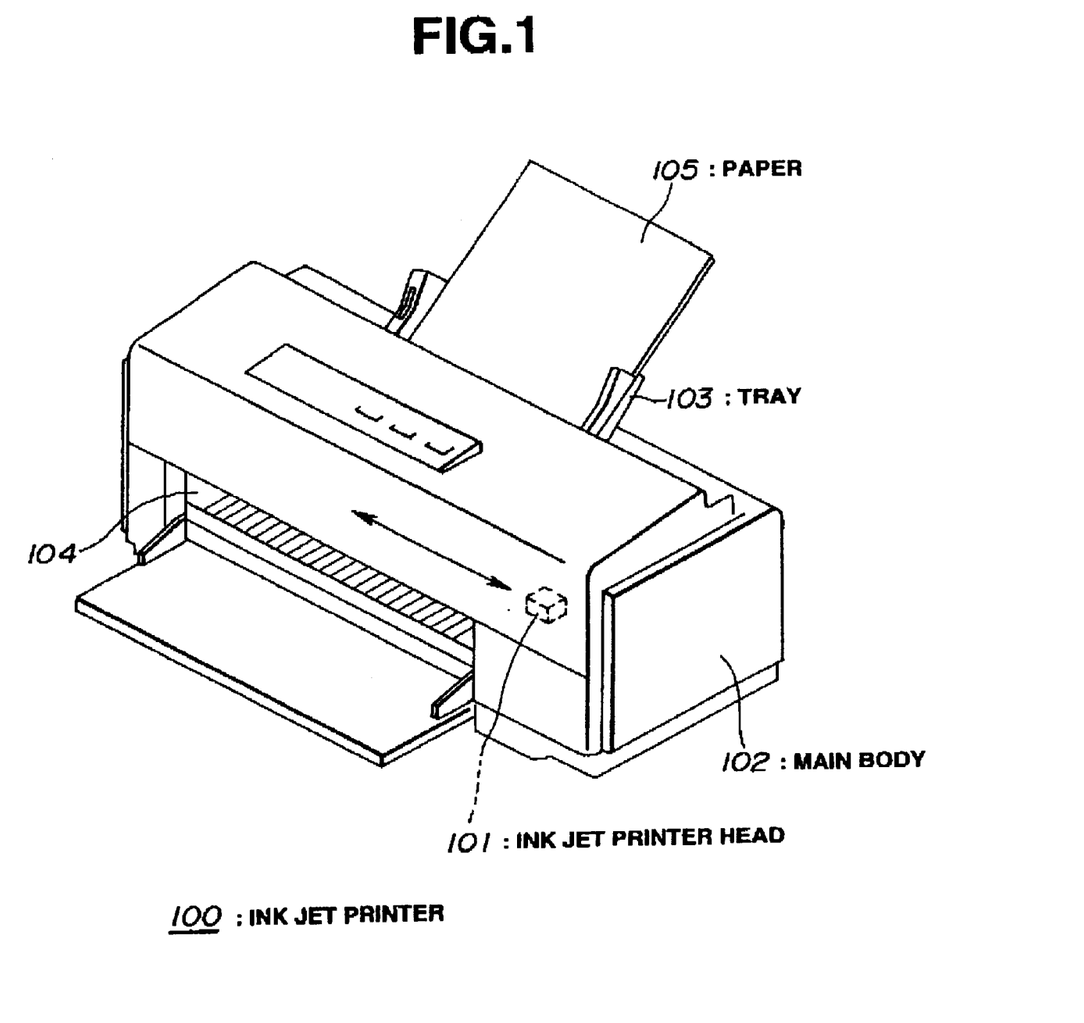
FIG. 1 is an overall perspective view of an ink jet printer.

FIG. 1 is a perspective view of a printer in which an ink jet printer head according to the present embodiment is used. As shown in FIG. 1, the ink jet printer 100 of the present embodiment is structured such that a main body 102 comprises an ink jet printer head 101 according to the present invention, a tray 103, and other elements. Paper 105 is placed in the tray 103. When printing data is supplied from a computer (not shown), an internal roller (not shown) draws the paper 105 into the main body 102. While passing by the roller, the paper 105 is printed upon by the ink jet printer head 101 which is driven in the direction of the arrow in FIG. 1, and is then discharged from a discharge opening 104. If the ink drops are not ejected from the ink jet printer head 101 precisely, then the characters or the like printed on the paper 105 will become smeared or faint.

Figure 2:
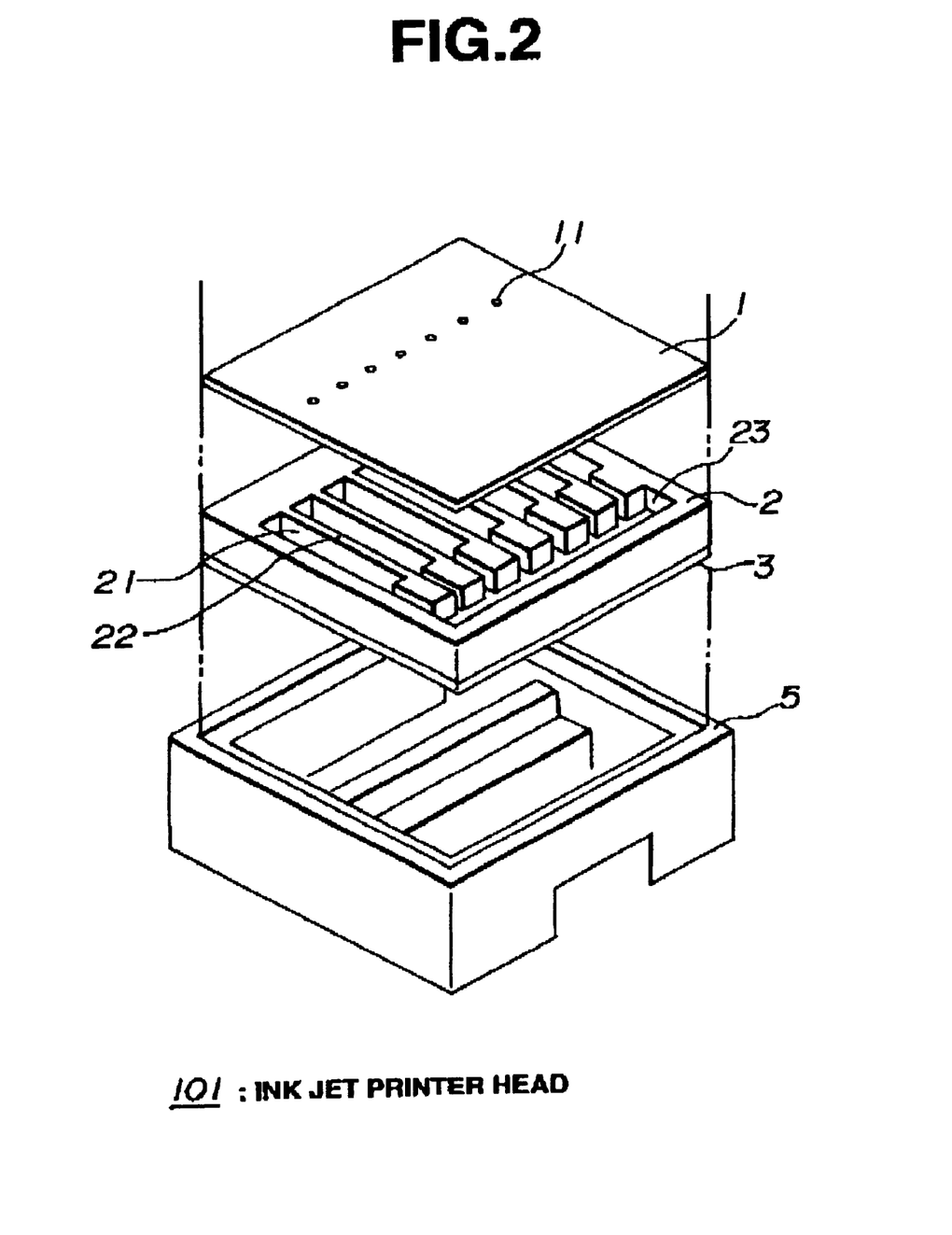
FIG. 2 is a perspective view explaining the structure of an ink jet printer head.

FIG. 2 is a perspective view explaining the structure of the ink jet printer head of the present embodiment. As shown in FIG. 2, the ink jet printer head 101 is composed of a nozzle plate 1 provided with nozzles 11 and a flow path board 2 provided with a vibrating plate 3, all fitted into a case 5. The flow path board 2 may also be referred to as a pressure chamber board, and has formed therein cavities (pressure chambers) 21, side walls 22 and a reservoir 23. The characteristic feature of the present invention relates to processing of the surface of the nozzle plate of the ink jet printer head. Note also that in the present embodiment the reservoir for storing the ink is provided in the flow path board, but it is also possible to give the nozzle plate a multilayer structure and provide the reservoir inside the nozzle plate.

Figure 3:
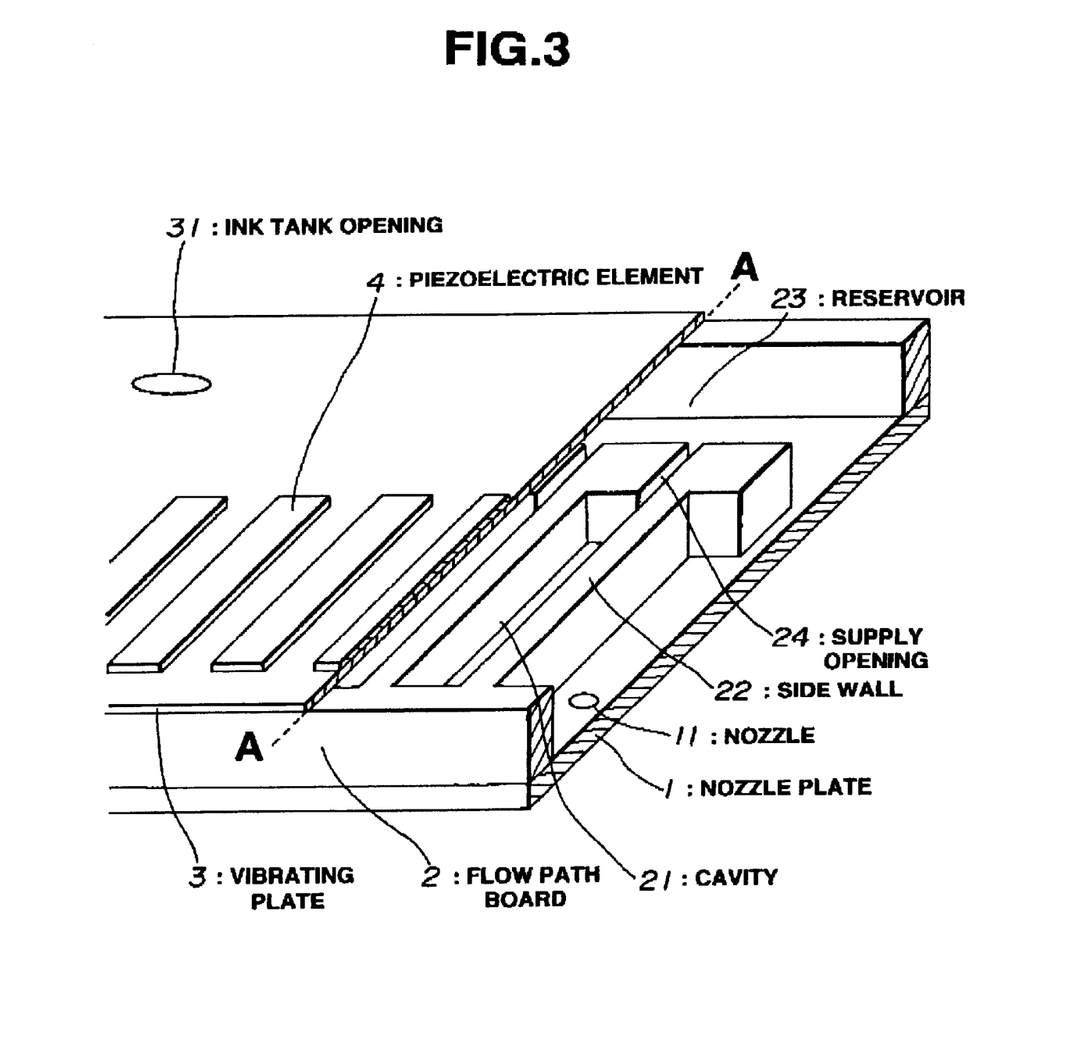
FIG. 3 is a perspective view (partially sectioned) of the main part of an ink jet printer head.

FIG. 3 is a perspective view showing the structure of the main part of the ink jet printer head, which is made by laminating the nozzle plate 1, the flow path board 2 and the vibrating plate 3 on top of one another. To aid understanding, a partially sectioned view is shown. As shown in FIG. 3, the main part of the ink jet printer head has a structure in which the flow path board 2 is sandwiched between the nozzle plate 1 and the vibrating plate 3. A plurality of cavities 21, each of which functions as a pressure chamber, are provided in the flow path board 2 by etching a single crystal silicon board or the like. The cavities 21 are separated from one another by side walls 22. Each of the cavities 21 is connected to the reservoir 23 via a supply opening 24. Nozzles 11 are provided in the nozzle plate 1 in positions corresponding to the positions of the cavities 21 in the flow path board 2. The vibrating plate 3 is made of a thermal oxide film or the like. Piezoelectric elements 4 are formed on the vibrating plate 3 in positions corresponding to the positions of the cavities 21. An ink tank opening 31 is also provided in the vibrating plate 3. The piezoelectric elements 4 each have a structure in which a PZT element or the like is sandwiched between an upper electrode and a lower electrode (not shown).

Figure 4:
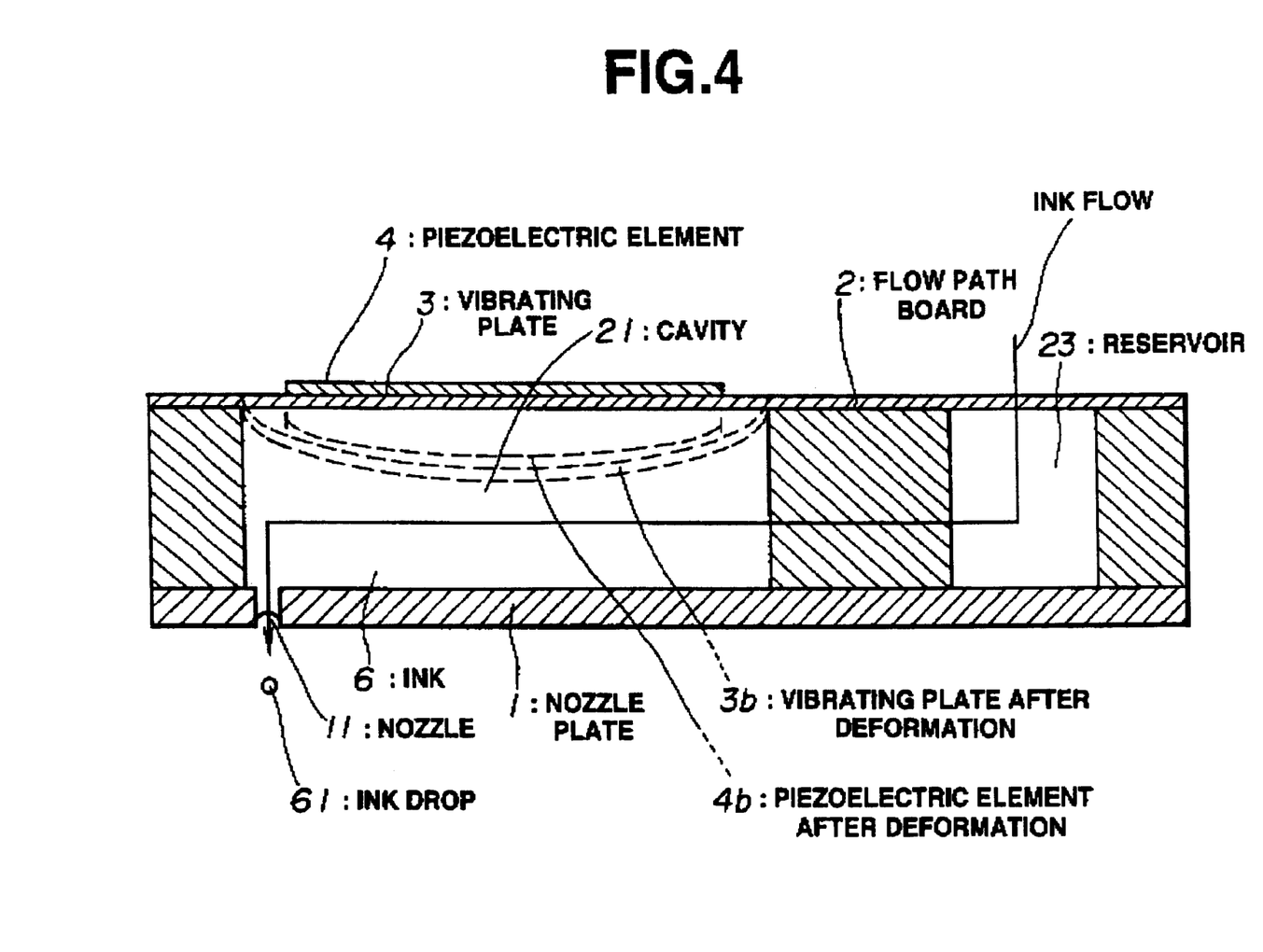
FIG. 4 is a diagram explaining the principle of operation of an ink jet printer head.

FIG. 4 is a sectional view through the ink jet printer head along line A—A shown in FIG. 3, and shows the operation principle of the ink jet printer head. Ink is supplied from an ink tank in the case 5 into the reservoir 23 via the ink tank opening 31 provided in the vibrating plate 3. The ink then flows from the reservoir 23 into the cavities 21 via the supply openings 24. When a voltage is applied between the upper and lower electrodes of one of the piezoelectric elements 4, the volume of this piezoelectric element 4 changes. This causes the vibrating plate 3 to deform, which in turn results in the volume of the cavity 21 corresponding to the piezoelectric element 4. When no voltage is applied, the vibrating plate 3 does not deform. However, when a voltage is applied, the vibrating plate 3 and the piezoelectric element 4 deform so as to be in the positions shown by the broken lines and the reference numerals 3b and 4b in FIG. 4. When the volume of the cavity 21 changes as a result, the pressure of the ink 6 that fills the cavity 21 increases, and an ink drop 61 is ejected from the nozzle 11.

Figure 5:
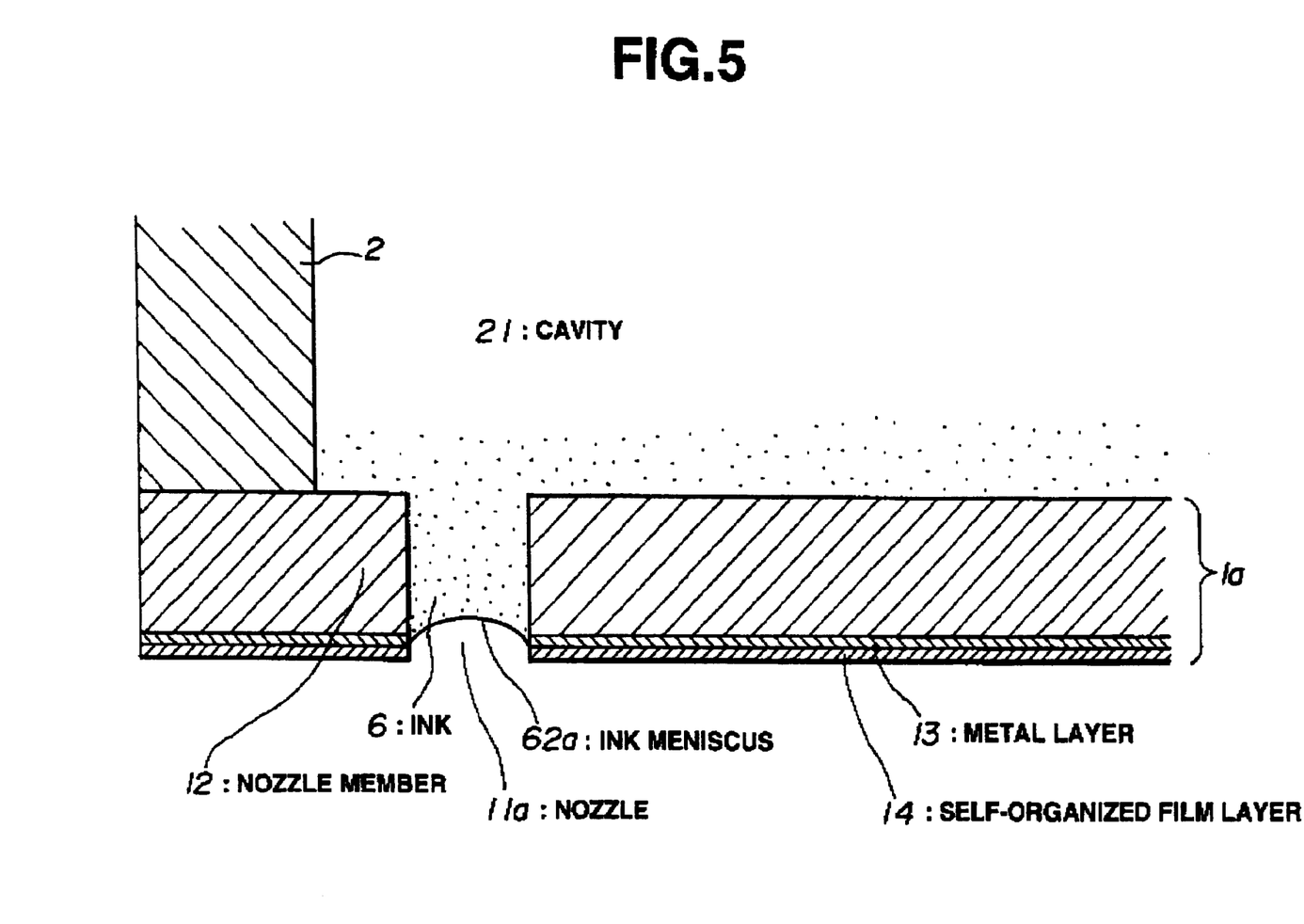
FIG. 5 is a sectional view of a nozzle plate according to a first embodiment.

FIG. 5 is a sectional view of the layer structure of the nozzle plate according to the present embodiment; it shows an enlargement of the vicinity of the nozzle shown in FIGS. 3 and 4. The reference numeral 1a indicates the nozzle plate of the present embodiment. The nozzle plate 1a is made by laminating a metal layer 13 and a self-organized film layer 14 on the ink drop ejection side of a nozzle member 12. In FIG. 5, constituent elements the same as those shown in FIGS. 2 and 3 are given the same reference numerals as in FIGS. 2 and 3. An ink meniscus 62a is formed in the nozzle 11a due to the surface tension of the ink. Specifically, due to the ink-repellent property of the self-organized film layer 14, the ink in the cavity 21 does not spread out over the surface of the nozzle plate 1a, but rather forms only an ink meniscus 62a in the nozzle 11a. Anything may be used as the nozzle member 12, provided the bonding to the metal layer 13 is of sufficient strength. For example, glass or a metal plate may be used, although to reduce the manufacturing cost and to make intricate processing such as the formation of the nozzles easy, it is preferable to use silicon or a ceramic material. Note that if silicon or a ceramic material is used, it is also preferable to provide an intermediate layer, as described later in the present embodiment (see FIG. 11). The metal layer 13 is preferably composed of gold (Au) as gold is chemically and physically stable, although other metals that chemically adsorb thiol compounds such as silver (Ag), copper (Cu), indium (In) and gallium-arsenic (Ga—As) may also be used. A publicly known technique such as sputtering, vapor deposition or plating can be used to form the metal layer 13 on the nozzle member 12; so long as a thin metal film of uniform thickness (for example 0.1 µm) can be formed, there are no particular limitations on the type of technique used. The self-organized film layer 14 is formed on top of the metal layer 13. The self-organized film layer 14 is formed by dissolving a polycyclic thiol compound and then immersing the nozzle plate 1a on which the metal layer 13 has been formed in the resulting solution.

Here, 'polycyclic thiol compound' is a generic term for all organic compounds that have a mercapto group (—SH) and contain at least two cyclic functional groups such as aromatic rings. Such polycyclic thiol compounds, when in a solution or under volatile conditions, spontaneously chemically adsorb onto the surface of a metal such as gold, forming a monomolecular film having a structure close to a two-dimensional crystalline structure. Such a molecular film formed by spontaneous chemical adsorption is called a self-assembled film or a self-organized film, and basic research and applied research into such films is currently in progress. In the present embodiment, use of gold (Au) in particular is supposed, but a self-assembled film can similarly be formed on surfaces of the other metals mentioned above.

By using such a polycyclic thiol compound, intermolecular cohesion is strengthened due to the polycyclic structure, becoming stronger than when a conventional alkanethiol compound, dithiol compound having a single aromatic ring, or the like is used. As a result, a highly reliable ink jet printer head that is friction-resistant in the sense that the self-organized film layer does not deteriorate through external factors such as mechanical friction but rather maintains its function can be obtained. Moreover, a self-organized film layer formed using such a polycyclic thiol compound is water-repellent, and hence there is little deterioration of ink drop ejection performance. Moreover, such a polycyclic thiol compound also has high heat resistance, and does not deteriorate upon heating.

The polycyclic thiol compound is preferably a compound represented by undermentioned general formula (I) or (II):

wherein Cf is $CF_3(CF_2)_n$, $CF_3(CF_2)_n(CH_2)_m$, $(CF_3)_2CF(CF_2)_n$, $(CF_3)_2CF(CF_2)_n(CH_2)_m$, $(CF_3)_3C(CF_2)_n$ or $(CF_3)_2C(CF_2)_n(CH_2)_m$, n is an integer greater than or equal to 0, m is an integer greater than or equal to 1, k is an integer greater than or equal to 3, p is an integer greater than. or equal to 1, and 1 is an integer from 1 to 4.

The compounds represented by general formula (I) are thiol compounds that contain a plurality of aromatic rings and have a perfluorocarbon chain in the para position of the endmost aromatic ring. The compounds represented by general formula (II) are the same as those represented by general formula (I), only the aromatic rings are each substituted with 1 to 4 fluorine atoms. If such a compound is used, tot only is friction resistance obtained as described above, but also the perfluorocarbon group, which is the tail group of the compound (i.e. the chemical functional group that is found on the surface of the self-organized film layer), gives the surface of the self-organized film layer a low surface energy, resulting in the nozzle surface having an even better water-repellent property. Moreover, the compounds represented by general formulae (I) and (II) also have excellent heat resistance.

Particularly preferable ones of the compounds represented by general formulae (I) and (II) are those for which Cf is $CF_3(CF_2)_n$ or $CF_3(CF_2)_n(CH_2)_m$, n is 0 to 15, m is 1 to 20, k is 3 or 4, p is 1 to 20, and 1 is 1 to 4; those for which Cf is $(CF_3)_2CF(CF_2)_n$ or $(CF_3)_2CF(CF_2)_n(CH_2)_m$, n is 0 to 15, m is 1 to 20, k is 3 or 4, p is 1 to 20, and 1 is 1 to 4; and those for which Cf is $(CF_3)_3C(CF_2)_n$ or $(CF_3)_3C(CF_2)_n(CH_2)_m$, n is 0 to 15, m is 1 to 20, k is 3 or 4, p is 1 to 20, and 1 is 1 to 4.

An example of a route for synthesizing such a polycyclic thiol compound follows, with 4-trifluoromethylterphenylmethylthiol being taken as an example of the polycyclic thiol compound.

As shown in the above synthetic route, 2N sodium carbonate is added to 4-bromo-4'-methylbiphenyl, escenthally tetrakis (triphenylphosphine) palladium and deaerated benzene, and then a solution of 4-trifluoromethylbenzeneboronic acid is instilled in, and reaction is carried out to synthesize compound (1). Compound (1) so obtained, N-bromosuccinimide (NBS), carbon tetrachloride and azobisisobutyronitrile (AIBN) are then mixed together, and reaction is carried out to synthesize compound (2). Potassium thioacetate and deaerated DMF are next stirred together, and then a solution of compound (2) in deaerated DMF is instilled into the potassium thioacetate/DMF solution while continuing the stirring, and reaction is carried out to synthesize compound (3) Potassium hydroxide is then added to a suspension of compound (3) in ethanol, and reaction is carried out to synthesize compound (4) (the target compound, (4-trifluoromethyl-[1,1';4',1"]terphenyl-4"-yl)methanethiol).

A detailed example of the synthesis of the compound in each of the steps of the above synthetic route follows.

Compound (1)

6.0 g (24.48 mmol) of 4-bromo-4'-methylbiphenyl, 1.2 g (1.04 mmol) of tetrakis(triphenylphosphine)palladium and 80 ml of deaerated benzene were put into a flask, and were stirred at room temperature under a stream of nitrogen. 80 ml of 2N sodium carbonate was then added and stirring was continued for a while. A solution of 4.65 g (24.48 mmol) of 4-trifluoromethylbenzeneboronic acid in 50 ml of deaerated ethanol was then gradually instilled in under a stream of nitrogen, and after the instillation had been completed the reaction mixture was refluxed with stirring under a stream of nitrogen. After refluxing for 1 hour, a yellow crystalline solid appeared in the reaction mixture in the benzene phase.

After refluxing with stirring for 6 hours, the reaction mixture was returned to room temperature, and was then left overnight with the stirrer left on. Suction filtration was then carried out, whereupon pale yellow plate-like crystals were obtained. These crystals were repeatedly washed with benzene and ethanol, then washed with acetone and dried, whereupon colorless plate-like crystals (yield 6.45 g=90%) were obtained. The melting point and $^1$H-NMR spectrum of the obtained crystals were as follows.

Melting point: 268–270° C.
$^1$H-NMR (CDCl$_3$) 2.35 (s, 3H, ArCH3); 7.50 (d, 8.7 Hz, 2H, H-3", H-5"); 7.63 (d, 8.7 Hz, 2H, H-2", H-6"); 7.69–7.73 (m 8H, H-2'-H-6', H-2-H-6)

Compound (2)

3.0 g (10.26 mmol) of compound (1), 2.0 g (11.11 mmol of N-bromosuccinimide, 150 ml of carbon tetrachloride and 15 ml of azobisisobutyronitrile were mixed together in a flask, and the mixture was then refluxed with stirring for about 1 hour. Once it had been confirmed by silica gel thin layer chromatography that reaction was complete, the reaction mixture was cooled to room temperature. The mixture was filtered to remove succinimide, and then the filtrate was subjected to vacuum concentration to remove the carbon tetrachloride, whereupon a pale yellow solid was obtained. This crude product was dissolved in methylene chloride, and the solution was then put into a filter for suction filtration covered with silica gel for column chromatography, and was filtered to obtain a transparent colorless methylene chloride solution. This solution was subjected to vacuum concentration, whereupon white crystals (yield 3.23 g=80%) were obtained. The melting point and $^1$H-NMR spectrum of the obtained crystals were as follows.

Melting point: Decomposes above 300° C.
$^1$H-NMR (CDCl$_3$): 4.57 (s, 2H, ArCH$_2$Br); 7.50 (d, 8.7 Hz, 2H, H-3", H-5"); 7.63 (d, 8.7 Hz, 2H, H-2", H-6"); 7.69–7.73 (m, 8H, H-2'-H-6', H-2-H-6)

Compound (3)

1.75 g (15.32 mmol) of potassium thioacetate and 50 ml of deaerated DMF were put into a flask under a stream of nitrogen and then stirred at room temperature. 3.0 g (7.65 mmol) of compound (2) was then dissolved in 45 ml of deaerated DMF, and the resulting solution was instilled into the potassium thioacetate/DMF solution while continuing the stirring. Once the instillation had been completed, the mixture was stirred for 3 hours at room temperature, and was then stirred while heating to 70° C. for about a further 30 minutes under a stream of nitrogen. After reaction was complete, the mixture was filtered to remove potassium bromide, and then the filtrate was subjected to vacuum concentration to remove the DMF. Extraction was then carried out by adding water and methylene chloride, the methylene chloride phase was washed a number of times with water, and drying was carried out using magnesium sulfate. Filtration was then carried out to remove the magnesium sulfate, and the methylene chloride was removed by vacuum concentration, thus obtaining a gray crude products This crude product was purified by silica gel column chromatography (Wako-gel 100; solvent: methylene chloride/hexane=1), whereupon a pale yellow solid was obtained. This was lightly washed with a hexane/ether mixed solvent and then dried, whereupon pale yellow crystals (yield 1.41 g=0%) were obtained. The melting point and $^1$H-NMR spectrum of the obtained crystals were as follows.

Melting point: 190–192° C.
$^1$H-NMR (CDCl$_3$): 2.38 (s, 3H, COCH$_3$); 4.18 (s, 2H, ArCH$_2$SCO); 7.40 (d, 9 Hz, 2H, H-3", H-5"); 7.59 (d, 9 Hz, 2H, H-2", H-6"); 7.68–7.73 (m, 8H, H-2'-H-6', H-2-H-6)

Compound (4)

100 ml of ethanol and 0.6 g (1.638 mmol) of compound (3) were put into a flask, and the resulting suspension was stirred while heating to 90° C. 0.5 g of potassium hydroxide pellets was then added to the suspension, whereupon the suspension lost its cloudiness and a transparent solution was obtained. The mixture was stirred while heating at 90° C. for about a further 5 hours, and was then cooled to room temperature. About 15 ml of hydrochloric acid (30%) was then added, followed by 0 ml of water, and then the mixture was stirred for about 30 minutes. The insoluble matter produced as a result was filtered off, and was then washed with distilled water a number of times and dried. The resulting crystals were further lightly washed with an ether/hexane mixed solvent and then dried, whereupon light yellow crystals (yield 0.365 g=5%) were obtained. The melting point and $^1$H-NMR spectrum of the obtained crystals were as follows.

Melting point: 220–222° C.
$^1$H-NMR (CDCl$_3$): 1.82 (t, 6.7 Hz, 1H, 5H); 3.81 (d, 6.7 Hz, 2H, ArCH$_2$S); 7.43 (d, 8.7 Hz, 2H, H-3", H-5"); 7.61 (d, 8.7 Hz, 2H, H-2", H-6"); 7.69–7.73 (m, 8H, H-2'-H-6', H-2-H-6)

Moreover, another synthetic route to the polycyclic thiol compound 4-trifluoromethylterphenylmethylthiol is as follows.

-continued

In the above synthetic route, p-bromo-benzeneboronic acid and p-bromotoluene are reacted together in a benzene/ethanol mixed solvent in the presence of tetrakis(triphenylphosphine) palladium (0) and an aqueous solution of sodium carbonate, thus synthesizing 4-bromo-4'-methylbiphenyl. The 4-bromo-4'-methylbiphenyl so obtained and p-trifluoromethylbenzeneboronic acid are then similarly reacted together in a benzene/ethanol mixed solvent in the presence of tetrakis(triphenylphosphine) palladium (0 and an aqueous solution of sodium carbonate, thus synthesizing 4-trifluoromethyl-4'-methylterphenyl. N-bromosuccinimide (NBS) is then added to the 4-trifluoromethyl-4'-nethylterphenyl so obtained in the presence of azobisisobutyronitrile (AIBN), and reaction is carried out in a carbon tetrachloride solvent, thus synthesizing 4-trifluoromethyl-4'-bromomethylterphenyl. Thiourea is then added to the 4-trifluoromethyl-4'-bromomethylterphenyl so obtained in absolute ethanol, and reaction is carried out to produce a salt, which is then hydrolyzed with hydrochloric acid, thus synthesizing the target compound, 4-trifluoromethylterphetylmethylthiol.

The present invention also provides the polycyclic thiol compounds represented by general formulae (I) and (II). Preferable ones of these polycyclic thiol compounds are the ones given above as examples of a material for forming a self-organized film layer.

Figure 6:
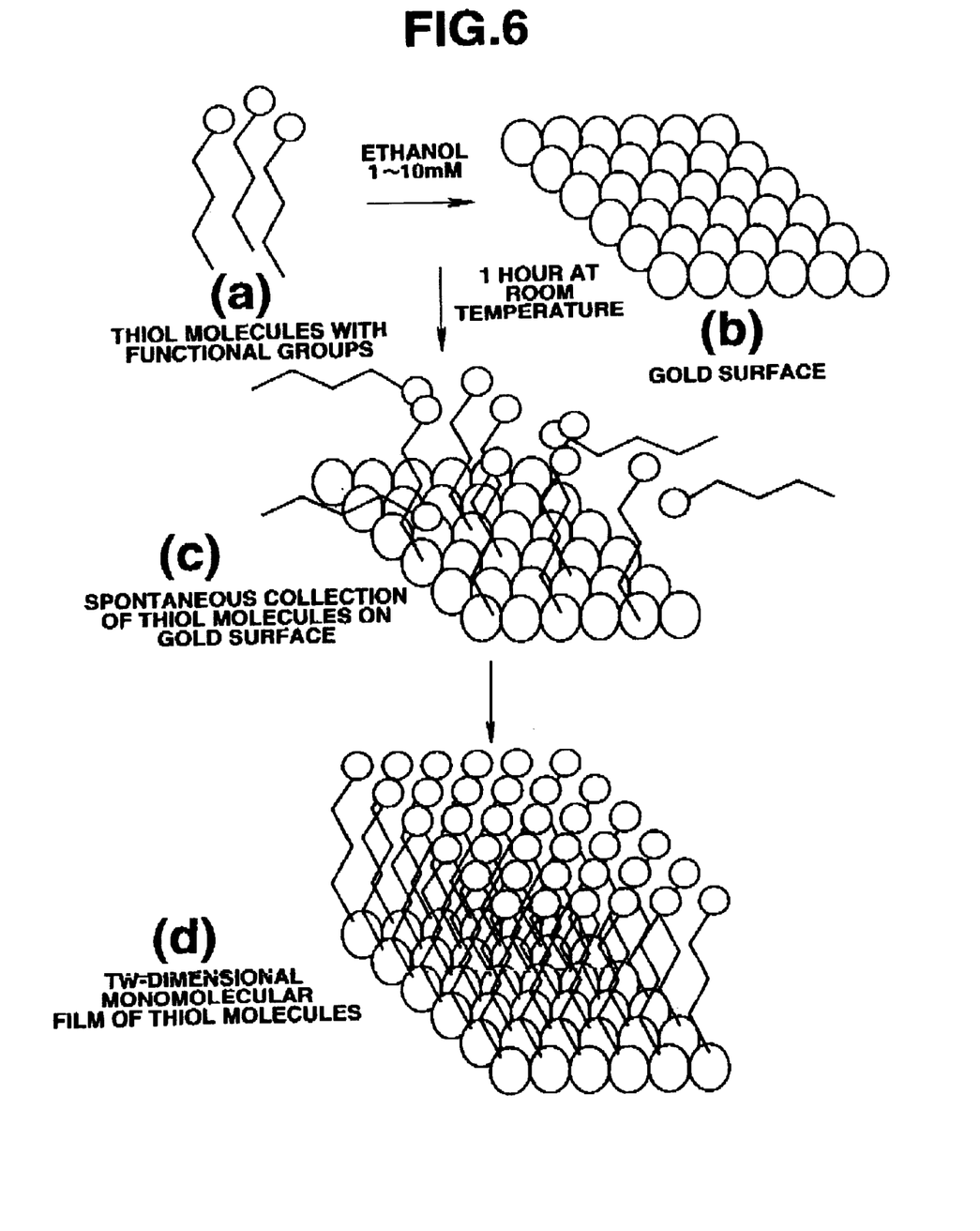
FIG. 6 consists of diagrams depicting bonding between thiol molecules and gold.

The method of forming the self-organized film layer from the polycyclic thiol compound will now be described with reference to FIG. 6. FIG. 6 shows a case in which gold is used for the metal layer. The polycyclic thiol compound, shown in (a) in FIG. 6, has a terphenyl group or the like as a head section and a mercapto group as a tail section. The polycyclic thiol compound is dissolved in a 1 to 10 mM ethanol solution. A gold film which has been formed as shown in (b) in FIG. 6 is immersed in the solution, and is left for about 1 hour at room temperature, where upon the polycyclic thiol compound spontaneously collects on the gold surface (c) in FIG. 6), thus forming a two-dimensional monomolecular film of thiol molecules on the gold surface ((d) in FIG. 6).

Figure 7:
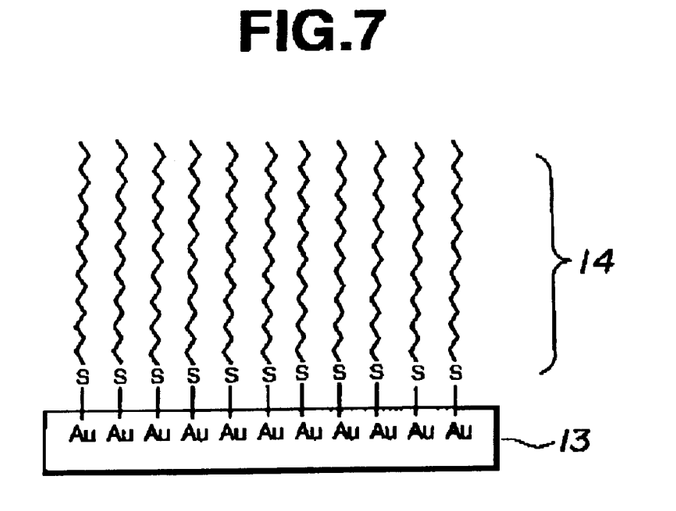
FIG. 7 is a diagram depicting bonding between sulfur atoms and gold atoms.

FIG. 7 shows the state of intermolecular bonding after the monomolecular film of the polycyclic thiol compound has been formed. The reaction mechanism of the chemical adsorption of sulfur atoms on a metal surface is not fully understood. Nevertheless, a structure in which the thiol compound is adsorbed, for example, on a gold (0) surface to produce a gold (1) thiolate (RS—$Au^+$) can be envisaged. As shown in FIG. 7, the bonds between the gold atoms of the metal layer 13 and the sulfur atoms of the self-organized film layer 14 are close to covalent bonds (40 to 45 kcal/mol), and hence an extremely stable molecular film is formed. Incidentally, one can envisage the use of such self organization of organic molecules, as a solid surface functionalization technique using an organic molecular film, being expanded into fields such as shining of the surfaces of materials, lubrication, wetting, anti-corrosion and surface catalysis. Moreover, application to the fields of microelectronics and bioelectronics in terms of molecular elements, bio-elements and the like also has a promising future.

Figure 8:
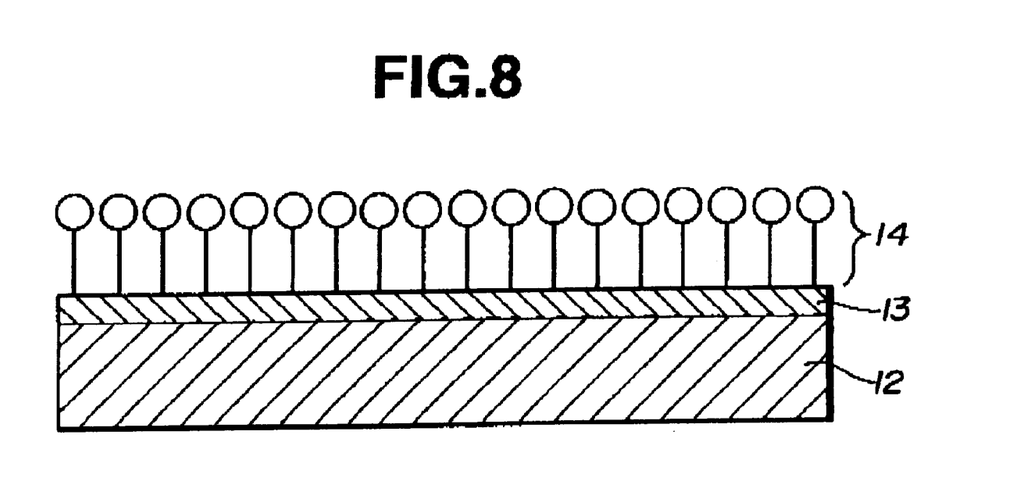
FIG. 8 is a diagram depicting the arrangement of thiol molecules on a gold surface.

FIG. 8 shows the state of the polycyclic thiol compound monomolecular film formed on the surface of the metal layer 13. As shown in FIG. 8, the self-organized film layer 14 is composed of a single layer of molecules, and is thus extremely thin (for example, about 2 nm) .The molecules of the polycyclic thiol compound gather together very tightly, and hence due to cohesive forces between the polycyclic sections, as described above the self-organized film layer 14 is not easily destroyed by external factors such as mechanical friction, that is, the self-organized film layer 14 has high friction resistance and hence excellent reliability. Moreover, because the molecules of the polycyclic thiol compound gather together very tightly, water molecules cannot enter into the self-organized film layer 14, and hence the self-organized film layer 14 is ink-repellent (i.e. water-repellent). In particular, if the self-organized film layer 14 is formed from a thiol compound represented by previously mentioned general formula (I) or (II), then the ink-repellent property becomes even more marked.

(Embodiment of the Self-organized Film Layer)

Figure 14:
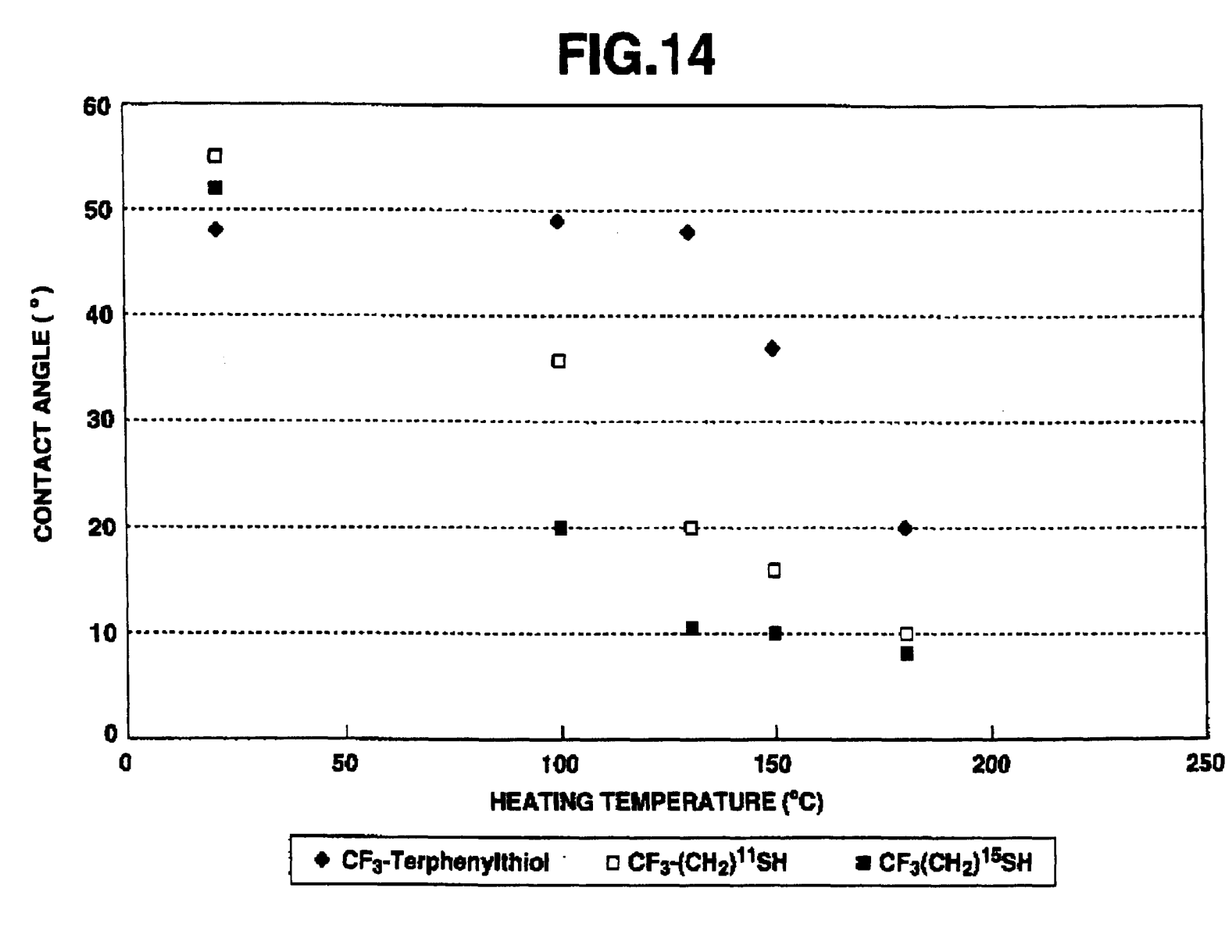
FIG. 14 is a graph showing the relationship between heating temperature and surface contact angle for a self-organized film.

A newly synthesized fluorinated thiol having a straight chain of benzene rings as a spacer (i.e. a polycyclic thiol compound according to the present invention) was used as the material from which the self-organized film layer 14 was formed in the ink jet printer head of the first embodiment, and a thin gold film was used as the metal layer 13, with the self-organized film layer made from the fluorinated thiol having a straight chain of benzene rings as a spacer being formed on top of the thin gold film. Moreover, as comparative embodiments, a self-organized film layer 14 was formed as with the present embodiment, only a conventional alkanethiol or fluorinated thiol having a methylene chain as a spacer was used as the material from which the self-organized film layer was formed. The thermal degradation properties of the present embodiment and the two comparative embodiments were then compared. Note that (4-trifluoromethyl-[1,1'; 4',1"]terphenyl-4"-yl)methanethiol synthesized following one of the previously described synthetic routes was used as the polycyclic thiol compound in the present embodiment, hexadecanethiol (made by Wako Junyaku) was used as the alkanethiol in one of the comparative embodiments, and 12,12,12-trifluorododecanethiol (synthesized in accordance with Journal of Fluorine Chemistry, 93 (1999), 107–115) was used as the fluorinated thiol in the other comparative embodiment. A substrate having a thin gold film (a gold substrate) was immersed for 24 hours in a 0.2 mM dichloromethane solution of each of the above thiols, thus producing self-organized films. The thermal degradation properties were compared by following changes in the surface wettability of each of the self-organized films by looking at the contact angle. A hexadecane solution was used in the measurement of the contact angle. The thermal degradation conditions were to leave the self-organized film in a constant temperature bath at one of various heating temperatures for 1 hour, after which the surface contact angle was measured. The change in the contact angle with temperature was then plotted for each of the self-organized films (see FIG. 14). It can be seen from the results in FIG. 14 that the speed of thermal degradation of the self-organized film made from a fluorinated thiol having a straight chain of benzene rings as a spacer (i.e. a polycyclic thiol compound according to the present invention) is slower than the speed of thermal degradation of the self-organized films made from the other thiols, that is thermal degradation occurs with more difficulty. Through this comparison, it can be seen that high heat resistance can be obtained by introducing straight chains of aromatic rings into the monomolecular film as spacers.

Figure 9:
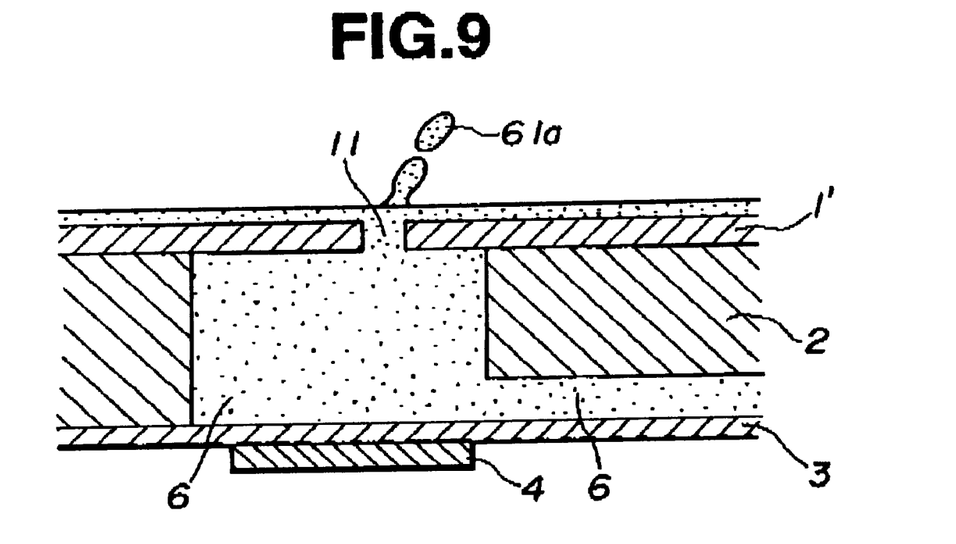
FIG. 9 is a diagram depicting ejection of ink from an ink jet printer head not having an ink-repellent property.

As shown in FIG. 9, in an ink jet printer head having no ink-repellent property, ink 6 tends to spread around the nozzle surface, in which case an ejected ink drop 61a may be pulled in a direction parallel to the nozzle plate 1' by the tension of the ink 6, and thus not be ejected perpendicular to the nozzle plate.

Figure 10:
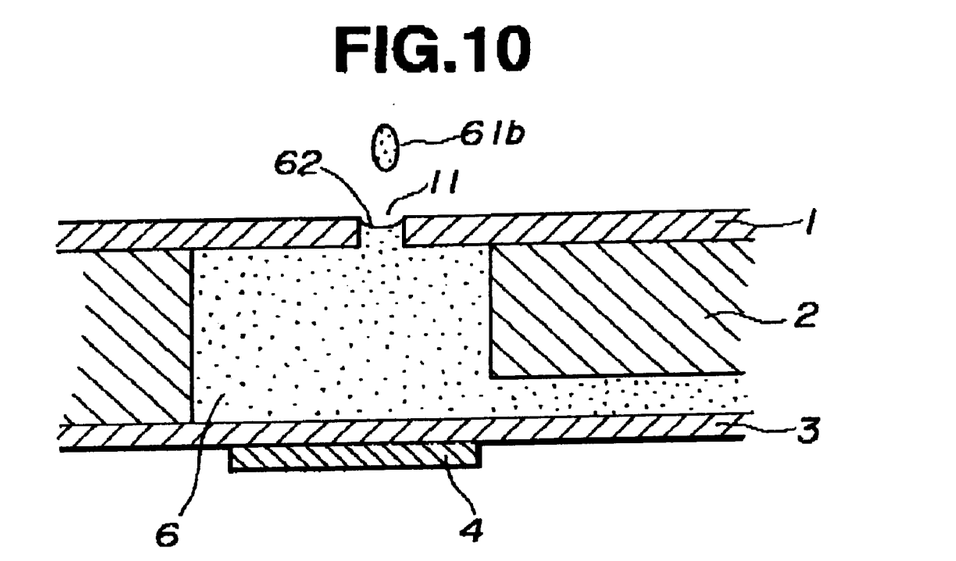
FIG. 10 is a diagram depicting ejection of ink from an ink jet printer head having an ink-repellent property.

On the other hand, in an ink jet printer to which the present invention has been applied, the nozzle surface has an ink-repellent property. As shown in FIG. 10, the ink 6 is always repelled from the nozzle surface, and thus stays inside the nozzle 11, forming a meniscus 62. An ejected ink drop 61b is thus ejected perpendicular to the nozzle plate, without being pulled in a direction parallel to the nozzle plate by the tension of the ink. Moreover, because the nozzle surface has an ink-repellent property, any ink that splashes onto the nozzle plate forms drops rather than spreading out over the nozzle surface, and hence such unwanted ink drops can easily be removed by wiping with an elastic body of rubber or the like.

(Formation of an Intermediate Layer)

Figure 11:
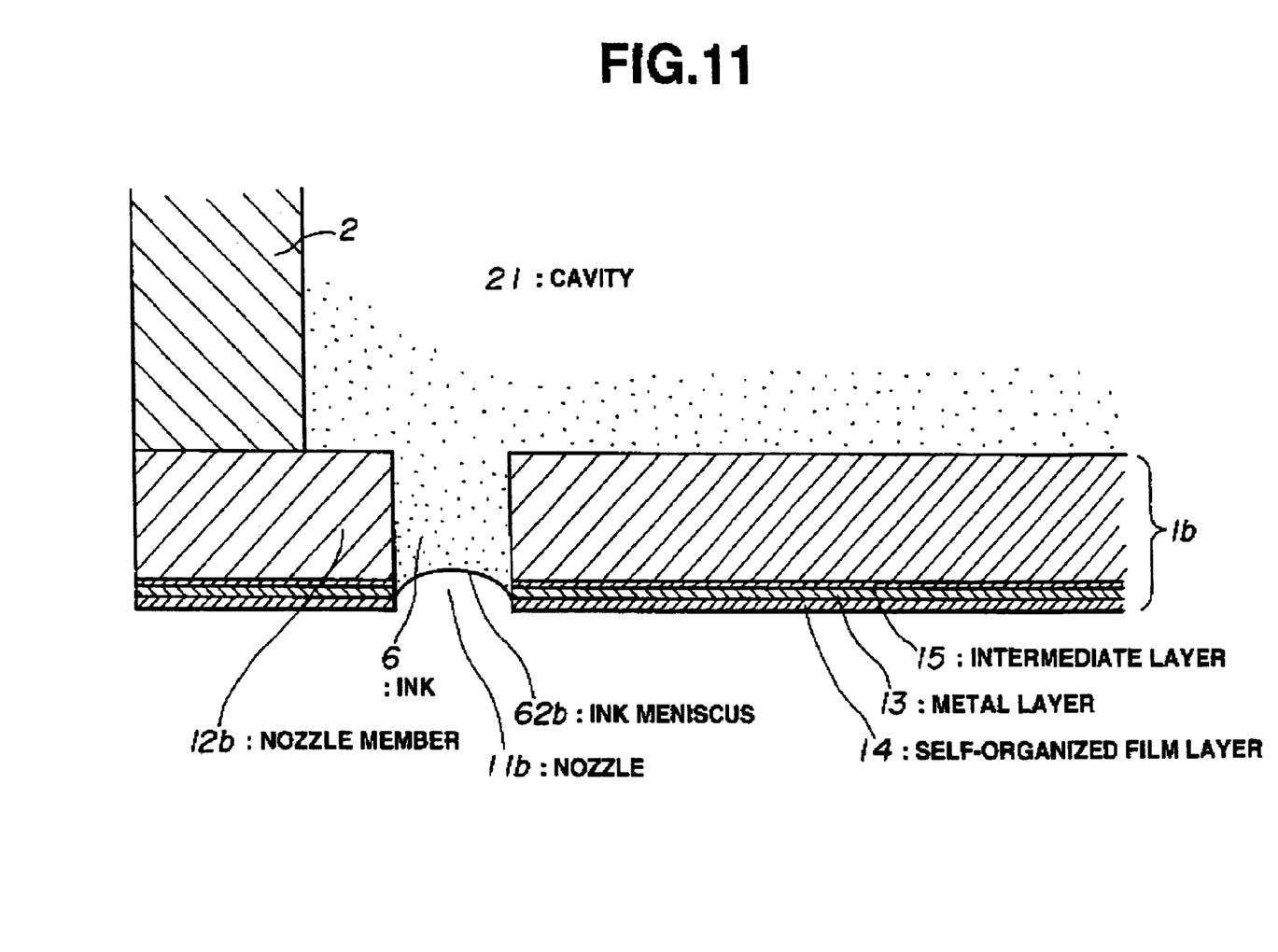
FIG. 11 is a sectional view of a nozzle plate provided with an intermediate layer according to the first embodiment.

FIG. 11 shows a sectional view of the layer structure of a nozzle plate provided with an intermediate layer. As mentioned previously, when silicon or a ceramic material is used for the nozzle member, which acts as a substrate, bonding between the nozzle member and the metal layer is strengthened if an intermediate layer is provided therebetween. In FIG. 11, elements the same as those in FIG. 10 are given the same reference numeral, and the explanation of these elements shall be omitted here. The nozzle member 12b is made of silicon or a ceramic material. The intermediate layer 15 is preferably made of a material that strengthens the bonding between the nozzle member and the metal layer, for example nickel (Ni), chromium (Cr) or tantalum (Ta), or an alloy thereof. By providing such an intermediate layer, bonding between the nozzle member and the metal layer is strengthened, and hence the self-organized film layer is even less likely to peel away under mechanical friction.

(Ink)

One of the thiol compounds described above is preferably mixed into the ink 6 used in the ink jet printer head in advance. If such a thiol compound is mixed into the ink in advance, then even if part of the self-organized film layer should be lost due to physical impact or the like, the thiol compound mixed into the ink will bond to the surface of the metal layer where the self-organized film layer has been lost, that is, a self-repairing capability is provided, and hence the user does not need to carry out any special repair work. In the above case, it is preferable to form the metal layer from gold as in the present embodiment. Gold has excellent malleability, and little is lost upon scratching. Gold also has excellent chemical resistance, resulting in an improvement in the chemical resistance of the nozzle member as a whole.

(Second Embodiment)

Figure 12:
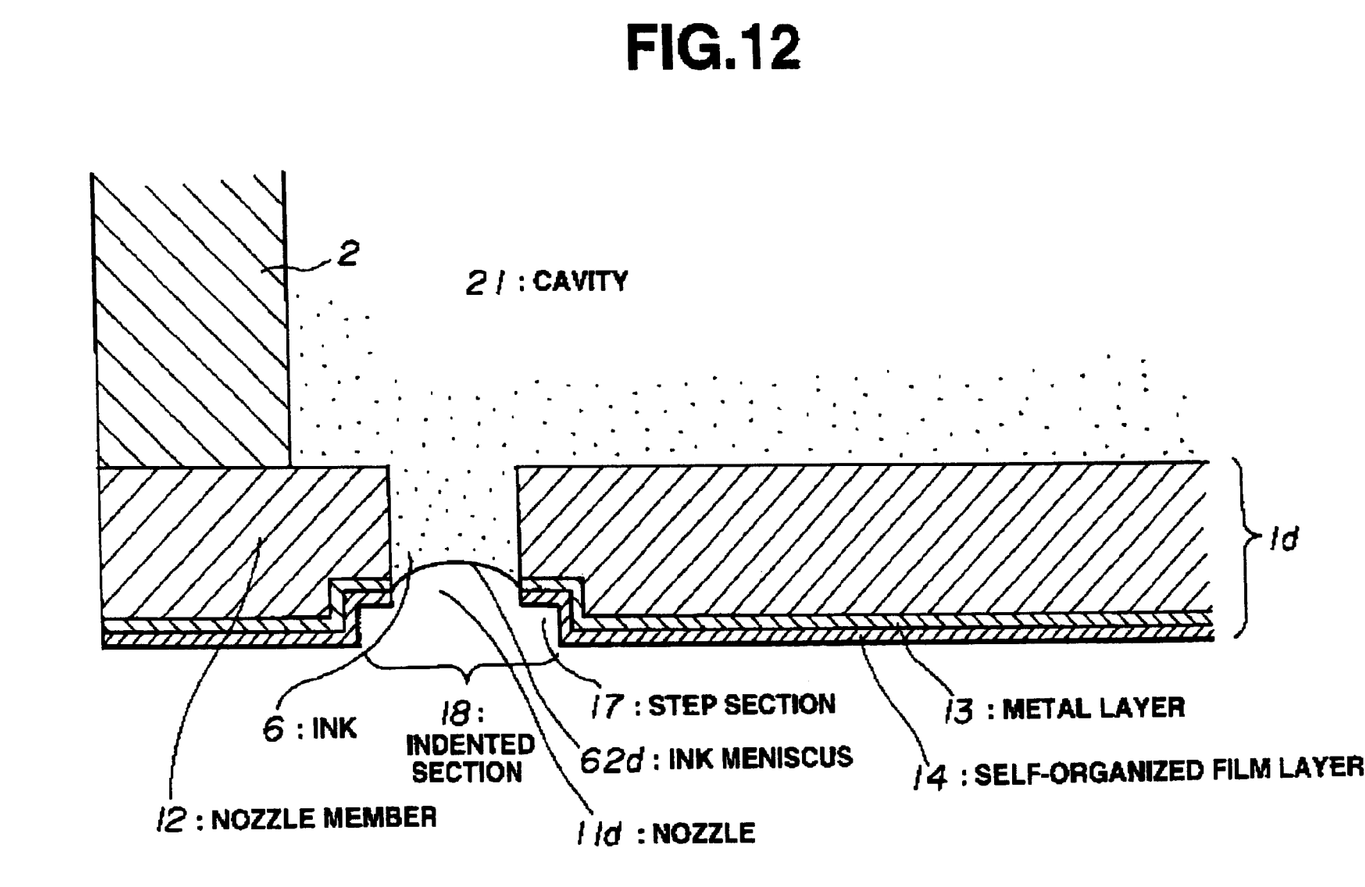
FIG. 12 is a sectional view of a nozzle plate for which each nozzle is provided with a step according to a second embodiment.

A second embodiment of the present invention relates to an improvement of a nozzle. FIG. 12 is an enlarged sectional view of the vicinity of a nozzle in a nozzle plate according to the second embodiment. Elements that are the same as those in the first embodiment (FIG. 5) are given the same reference numeral, and the explanation of these elements shall be omitted here. As shown in FIG. 12, in the nozzle plate 1d of the present embodiment, a step section 17 is provided around the periphery of each nozzle 11d, and hence an indented section 18 that is concentric with the bore of the nozzle 11d is formed. The metal layer 13 and the self-organized film layer 14 are formed inside the step section 17 and the indented section 18 as well as on the nozzle surface. The compositions of the metal layer and the self-organized film layer may be assumed to be the same as in the above-mentioned first embodiment. Moreover, in FIG. 12, only the metal layer and the self-organized film layer are provided, but an intermediate layer may also be provided between the nozzle member and the metal layer as shown in FIG. 11. According to this second embodiment, because a step section 17 and an indented section 18 are provided in each nozzle 11d, even if a sharp object comes into contact with the surface of the nozzle plate 1d, the metal layer 13 and the self-organized film layer 14 will not be damaged in the indented section 18, and hence there will be no change in the meniscus 62d of the ink 6 and no deterioration of ink drop ejection performance.

(Third Embodiment)

This is an example of an ink jet printer head that operates by means of heat-generating elements.

Figure 13:
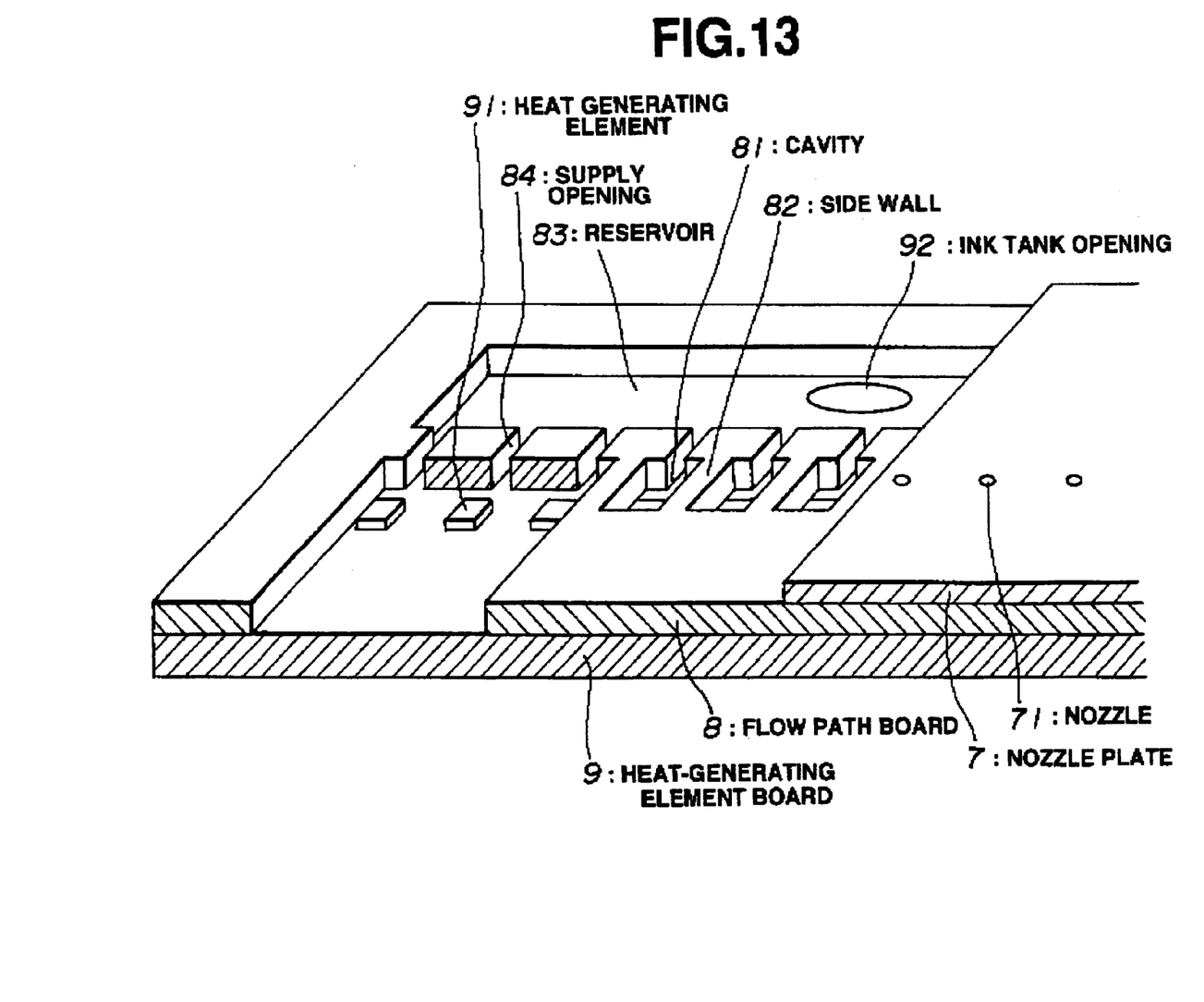
FIG. 13 is a perspective view of an ink jet printer head that uses heat-generating elements according to a third embodiment.

FIG. 13 is a perspective view explaining the structure of the ink jet printer head of the present embodiment. The ink jet printer head is composed primarily of a nozzle plate 7, a flow path board 8 and a heat-generating element board 9. Nozzles 71 are provided in the nozzle plate 7. Any of the metal layer 13, the self-organized film layer 14 and the intermediate layer 15 described in the first embodiment and the step section 17 and the indented section 18 described in the second embodiment may be applied to the nozzle plate 7. Cavities 81, side walls 82, a reservoir 83 and supply openings 84 are formed in the flow path board 8. The structures of these elements may be assumed to be the same as for the flow path board 2 described in the first embodiment. The cavities 81 are arranged with a fixed interval between adjacent cavities corresponding to the printing density, and are separated from one another by the side walls 82. Each cavity 81 is surrounded by two of the side walls 82 of the flow path board 8, the nozzle plate 7 and the heat-generating element board 9. Heat-generating elements 91 are provided on the heat-generating element board 9 in positions corresponding to the positions of the cavities 81. An ink tank opening 92 for supplying ink into the reservoir 83 is also provided. In this configuration, ink is fed from an ink tank (not shown) into the reservoir 83 via the ink tank opening 92. The ink is then supplied from the reservoir 83 into the cavities 81 via the supply openings 84. When an electric signal is supplied from a driving circuit (not shown) to a heat-generating element 91, the heat-generating element 91 generates heat. As a result, the ink filling the cavity 81 corresponding to the heat-generating element 91 in question vaporizes and air bubbles are generated. These air bubbles cause ink to be ejected from the nozzle 71 corresponding to the cavity 81. The surface on the ejection side of the nozzle plate 7 has a structure as described in the first and second embodiments, again giving high friction resistance and excellent reliability. Moreover, the surface on the ejection side of the nozzle plate 7 has an ink-repellent property, and hence there is no residual ink on the nozzle surface that could pull the ejected ink in a direction parallel to the nozzle surface and bend the direction of ejection. As described above, according to this third embodiment, the present invention can also be applied to the type of printer head in which ink is ejected by generating air bubbles using heat-generating elements. The same effects as those described in the first and second embodiments are thus obtained.

As described above in each of the embodiments, according to the ink jet printer head and manufacturing method thereof of the present invention, a self-organized film layer having high friction resistance can be formed, and hence deterioration of the printer head due to external factors such as mechanical friction can be suppressed.

INDUSTRIAL APPLICABILITY

According to the present invention, a highly reliable ink jet printer head exhibiting a water-repellent property, low deterioration of ink drop ejection performance, and high friction resistance, along with a method of manufacturing this ink jet printer head, can be provided.

What is claimed is:

1. An inkjet head, wherein ink drops are ejected from nozzles formed in a nozzle surface, comprising:
   a metal layer comprising metal formed on said nozzle surface; and
   a self-organized film layer consisting essentially of a polycyclic thiol compound formed on a top of said metal layer.

2. The inkjet head according to claim 1, wherein an intermediate layer consisting of nickel, chromium, tantalum or titanium, or an alloy thereof, is provided between a member that forms said nozzle surface and said metal layer.

3. The inkjet head according to claim 1, wherein said self-organized film layer is formed on inner walls of said nozzles.

4. The inkjet head according to claim 1, wherein said nozzles are provided in indented sections provided in said nozzle surface.

5. The inkjet head according to claim 1, further comprising cavities into which ink is filled and pressure-applying devices that produce volume changes in said cavities, wherein ink drops are ejected from said nozzles through said volume changes in said cavities.

6. The inkjet head according to claim 5, wherein said pressure-applying devices are piezoelectric elements.

7. The inkjet head according to claim 5, wherein said pressure-applying devices are heat-generating elements.

8. The inkjet head according to claim 1, wherein said polycyclic thiol compound is a compound represented by undermentioned general formula (I) or (II):

wherein Cf is $CF_3(CF_2)_n$, $CF_3(CF_2)_n(CH_2)_m$, $(CF_3)_2CF(CF_2)_n$, $(CF_3)_2CF(CF_2)_n(CH_2)_m$, $(CF_3)_3C(CF_2)_n$, or $(CF_3)_3C(CF_2)_n(CH_2)_m$, n is an integer greater than or equal to 0, m is an integer greater than or equal to 1, k is an integer greater than or equal to 3, p is an integer greater than or equal to 1, and l is an integer from 1 to 4.

9. The inkjet head according to claim 8, wherein, in said general formula (I) or (II), Cf is $CF_3(CF_2)_n$ or $CF_3(CF_2)_n(CH_2)_m$, n is an integer from 0 to 15, m is an integer from 1 to 20, k is 3 or 4, p is an integer from 1 to 20, and l is an integer from 1 to 4.

10. The inkjet head according to claim 8, wherein, in said general formula (I) or (II), Cf is $(CF_3)_2CF(CF_2)_n$ or $(CF_3)_2CF(CF_2)_n(CH_2)_m$, n is an integer from 0 to 15, m is an integer from 1 to 20, k is 3 or 4, p is an integer from 1 to 20, and l is an integer from 1 to 4.

11. The inkjet head according to claim 8, wherein, in said general formula (I) or (II), Cf is $(CF_3)_3C(CF_2)_n$ or $(CF_3)_3C(CF_2)_n(CH_2)_m$, n is an integer from 0 to 15, m is an integer from 1 to 20, k is 3 or 4, p is an integer from 1 to 20, and l is an integer from 1 to 4.

12. A method of manufacturing the ink jet printer head according to claim 1, comprising the steps of:
    forming a metal layer on a nozzle surface of a nozzle member; and
    immersing said nozzle member on which said metal layer has been formed in a solution in which a polycyclic thiol compound has been dissolved.

13. A polycyclic thiol compound comprises an undermentioned general formula (I) or (II):

wherein Cf is $CF_3(CF_2)_n$, $CF_3(CF_2)_n(CH_2)_m$, $(CF_3)_2CF(CF_2)_n$, $(CF_3)_2CF(CF_2)_n(CH_2)_m$, $(CF_3)_3C(CF_2)_n$ or $(CF_3)_3C(CF_2)_n(CH_2)_m$, n is an integer greater than or equal to 0, m is an integer greater than or equal to 1, k is an integer greater than or equal to 3, p is an integer greater than or equal to 1, and l is an integer from 1 to 4.

* * * * *